United States Patent [19]

Mader

[11] 4,086,828
[45] May 2, 1978

[54] DISC BRAKE PAD SPREADER

[75] Inventor: William G. Mader, York, Pa.

[73] Assignee: K-D Manufacturing Company, Lancaster, Pa.

[21] Appl. No.: 816,295

[22] Filed: Jul. 18, 1977

[51] Int. Cl.² .................................................. B23P 19/04
[52] U.S. Cl. ........................................... 81/3 K; 29/239; 254/126
[58] Field of Search ............................ 29/239; 81/3 K; 254/126, 9 R, 9 B, 9 C, 100, 67, 104

[56] References Cited

U.S. PATENT DOCUMENTS

| 1,941,301 | 12/1933 | Hanson et al. | 254/122 |
| 3,727,490 | 4/1973 | Diffenderfer et al. | 29/239 |
| 3,901,356 | 8/1975 | Batler | 254/104 |

FOREIGN PATENT DOCUMENTS 16,726 of 1904 United Kingdom ................ 254/126

Primary Examiner—James L. Jones, Jr.
Attorney, Agent, or Firm—Paul & Paul

[57] ABSTRACT

A manually-operable tool is provided for insertion between the inboard and outboard caliper-mounted disc brake pads for the purpose of spreading the pads to facilitate placement over the rotor. The tool employs a screw having an elongated partially-threaded shank and a handle at the rearward end for manually rotating the screw about its axis. Supported on a non-threaded portion of the screw shank is a pivot-stud body having pivot studs extending laterally in opposite directions. Supported on the pivot studs, on each side of the screw shank, is a pair of scissor-like jaw levers or spreaders. Supported for sliding movement on the screw shank rearward of the pivot-stud body, i.e., between the pivot-stud and the shoulder of the handle, is a shoulder-stud body having camming studs extending laterally in opposite directions into the rearward jaw openings of the scissor-like spreaders. Threaded on the screw shank forward of the pivot-stud body is a shoulder-nut body having camming studs extending laterally in opposite directions into the forward jaw openings of the spreaders. When the screw is turned in a proper direction, the forward and rearward sets of camming studs are moved toward each other into the crotches of the scissor-like spreaders to spread both pairs of spreaders, thereby to spread, or to maintain at spaced separations, the inboard and outboard disc brake pads.

12 Claims, 4 Drawing Figures

U.S. Patent May 2, 1978 4,086,828
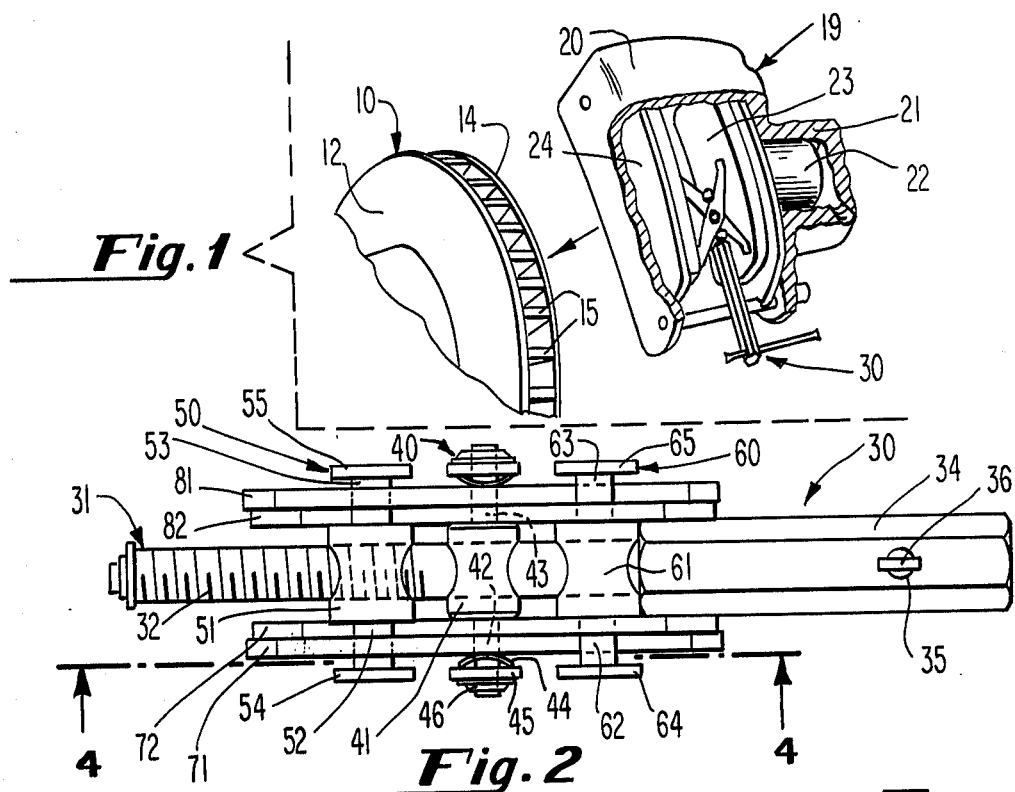
Fig. 1
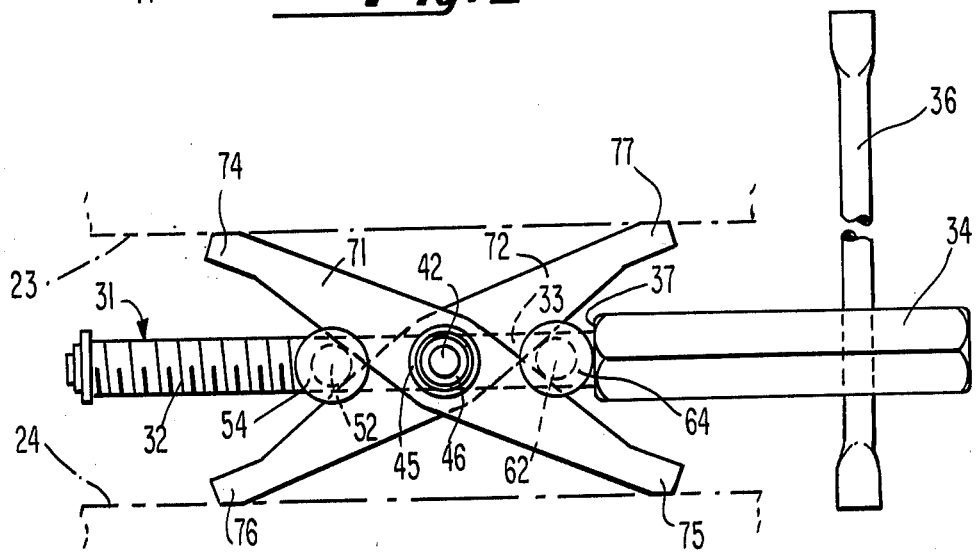
Fig. 2
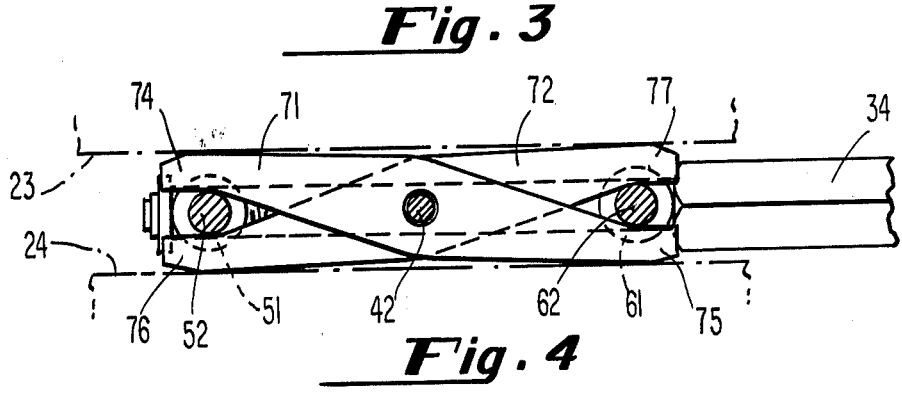
Fig. 3
Fig. 4

DISC BRAKE PAD SPREADER

BACKGROUND OF THE INVENTION

The present invention relates to a spreading tool to assist in mounting caliber-mounted disc brake pads onto the rotor. The rotor will be understood to have opposed disc braking surfaces. A spreader tool for this purpose is shown, described and claimed in U.S. Pat. No. 3,727,490, granted Apr. 17, 1973, to W. L. Diffenderfer et al, and is assigned to the assignee of the present application.

SUMMARY OF THE INVENTION

The purpose of the present invention is to provide an improved disc brake pad spreader tool which is more positive and dependable in its action than the tool disclosed in the aforesaid earlier patent.

The improved tool, according to the present invention, avoids the use of the frame and carrier plates which were employed in the tool of the earlier patent to support the scissor-like jaw levers.

The improved tool also avoids the use of biasing springs.

BRIEF DESCRIPTION OF THE DRAWINGS

FIG. 1 is a perspective view of a fragmentary portion of a motor-vehicle disc brake rotor showing to the right thereof a caliper having mounted therein a pair of disc brake pads which are to be assembled over the rotor. In FIG. 1, the caliper body is broken away to show the spreader tool of the present invention in working position between the opposing disc brake pads.

FIG. 2 is plan view of the tool of the present invention.

FIG. 3 is a side elevational view showing the tool with jaws spread open.

FIG. 4 is a view looking along the line 4—4 of FIG. 2 but showing the spreader with jaws in closed position.

DETAILED DESCRIPTION OF THE PREFERRED EMBODIMENTS

Referring now to FIG. 1, a fragment of a disc brake rotor 10 is shown having opposing disc braking surfaces 12 and 14 spaced apart by cooling vanes 15.

Also shown in FIG. 1 is a caliper 19 comprising a main housing 20 having an offset portion 21 containing a fluid-actuated cylinder piston 22 which, when actuated, is adapted to move inboard disc brake pad 23 inwardly toward the center axis of the caliper. The reaction force of the cylinder piston 22 is against the piston housing 21. This force is transmitted to main housing 20 and causes housing 20 to move toward the right as viewed in FIG. 1, thereby pushing the outboard disc brake pad 24 inwardly toward the center axis of the caliper.

Also shown in FIG. 1 is a spreader tool 30 constructed in accordance with the present invention. Spreader tool 30 is shown inserted between the two disc brake pads 23 and 24. The purpose of the spreader tool is to maintain pads 23 and 24 spread apart so as to facilitate mounting of caliper 20 and its brake pads over the rotor 10 in such floating position that the inboard pad 23 faces the inner disc-braking surface 14 and the outboard brake pad 24 faces the outer disc-braking surface 12. In this specification, the term disc brake "pads" is used. Such "pads" are sometimes referred to as brake "shoes" with brake linings.

Spreader tool 30 is shown in detail in FIGS. 2, 3, and 4. Tool 30 comprises an operating screw having an elongated shank 31 and an enlarged handle 34 having a transverse hole 35 therethrough for receiving a turn-bar 36 to facilitate turning of the screw on its axis. Screw handle 34 is preferably hexagonal in cross section but may be circular. The shank 31 of the screw has a threaded portion at its forward end and a non-threaded portion 33 intermediate the forward threaded portion 32 and the handle 34. The minimum diameter of screw handle 32 is larger than the outer diameter of non-threaded shank portion 33, 31 forming at the junction a thrust bearing surface or shoulder 37.

Supported on the non-threaded portion 33 of the shank 31 is a pivot stud 40 having a body 41 having a through hole through which the non-threaded portion of the screw shank passes. Extending laterally outwardly in opposite directions from the pivot stud body 41 are studs 42 and 43. Supported on the one stud 42 is a pair of scissors-like lever members 71 and 72 each of which has a transverse center hole through which stud 42 passes. Supported on the opposite stud 43 is a second pair of scissors-like levers 81 and 82 each of which has a transverse center hole through which the stud 43 passes. Thus, the two pairs of scissors-like levers or spreaders are supported by pivot studs 42 and 43 on opposite side of the elongated shank 31 of the operating screw, and are secured by dished springs 44, washers 45, and nuts 46.

Also supported on the non-threaded portion 33 of the shank 31 of the screw, rearwardly of pivot stud 40 and forwardly of shoulder 37 of handle 34 is a shoulder stud 60 having a body portion 61 having a through hole through which the non-threaded portion 33 of the screw passes. Extending laterally outwardly from either side of the body portion 61 are camming pins 62 and 63 each of which has an enlarged head at its outward end identified 64 and 65. Camming pin 62 on one side of the screw shank is positioned in the rearward jaw opening of the scissors-like levers 71 and 72, as illustrated in FIG. 3. Similarily, the other camming pin 63 is positioned in the rearward jaw opening of the scissor-like levers 81 and 82 on the other side of the screw shank.

Supported on the threaded portion 32 of screw shank 31, forwardly of pivot stud 40, is a shoulder nut 50. Nut 50 has a body portion 51 having a through hole which is internally threaded to mesh with the external threads on the shank portion 32 of the operating screw. Extending laterally outwardly in opposite directions from the body portion 51 of shoulder nut 50 are camming pins 52 and 53 each of which has an enlarged head at its outer end identified 54 and 55 respectively.

As seen in FIG. 3, camming stud 52 extends into the forward jaw opening of scissors-like levers or spreaders 71, 72 on the one side of the screw shank, and, on the opposite side of the screw shank, not visible in FIG. 3, camming stud 53 extends into the corresponding forward jaw opening of the scissors-like levers or spreaders 81, 82.

In operation, spreader tool 30 with the jaws of the scissors-like levers fully closed, as illustrated in FIG. 4, or partially closed, depending upon the separation between the pads at the time of insertion, is inserted between the inboard and outboard pads 23, 24. Handle 34 of the screw is then rotated, as by means of turn bar 36 or otherwise, in a direction to cause the screw shank 32 to move forwardly relative to the nut 50, i.e., to the left as viewed in FIGS. 2–4. Handle 34 also moves forwardly, and since shoulder 37 is bearing against body 61 of the shoulder stud 60, such forward movement of the screw handle causes shoulder stud 60 to also move forwardly, i.e., to the left in a sliding manner on the non-threaded portion 33 of the shank. As a result, the set of camming studs 62, 63 push forwardly against the crotches of the scissor-like lever arms or spreaders 71, 72 and 81, 82 on opposite sides of the axis of the screw 31.

Simultaneously, in response to the resistance offered by the scissor-like arms 71, 72 and 81, 82 to forward movement of shoulder stud 60, and to other resistance to forward movement of the screw shank, such as the frictional resistance between the screw threads of nut 50 and shank 32, shoulder nut 50 moves rearwardly, i.e., to the right as viewed in FIGS. 2-4, on the threaded portion 32 of the screw shank. As a result, camming stud 52 pushes rearwardly against the forward crotch of the scissor-like lever arms 71, 72 on the one side of the screw axis, as seen in FIG. 3, and camming stud 53 pushes rearwardly against the corresponding crotch of the scissor-like lever arms 81, 82 on the opposite side of the screw, thereby spreading the lever arms of the spreaders.

The four jaws at the ends of the lever arms 71, 72 identified in FIG. 3 by the reference numerals 74, 75, 76 and 77, are beveled, as shown in the drawing to provide, when the arms are spread, area bearing surfaces as distinguished from line bearing surfaces, and these area bearing surfaces bear against and spread apart the inboard and outboard pads 23, 24, in the manner illustrated in FIG. 3. The four jaws of the scissor-like levers 81, 82 on the opposite side of the screw axis are similarly beveled, and the action is similar.

It will be seen that in the new tool the scissor-like spreaders are mounted for pivotal movement on lateral pivot-studs which are supported in a body mounted for sliding movement on the screw shank. This allows the screw to slide lengthwise relative to the pivot-stud body. Also mounted for sliding movement on the screw shank is a second body carrying a first set of lateral camming studs which project into the jaw openings on one side of the central pivot point of the scissor-like spreaders. Abutting against this second body is a thrust bearing surface, which may be the end of the screw handle. Threadingly mounted on the screw shank on the other side of the central pivot point of the scissor-like spreaders is a nut having projecting laterally therefrom a second set of camming studs which project into the other jaw openings of the spreaders. The effect of rotating the screw in a direction to spread the spreaders is to cause the two sets of camming studs to move in opposing directions toward the central pivot point of the scissor-like spreaders, thereby spreading the spreaders. The action is positive. No biasing springs are involved. The action is such that the camming forces of the two sets of camming studs are automatically equalized.

What is claimed is:

1. A hand tool for spreading, or maintaining at spaced separation, caliper-mounted disc-brake pads for facilitating mounting on a disc-brake rotor, said tool comprising:
  a. an elongated screw having a threaded shank at the forward end and a thrust bearing surface toward the rearward end;
  b. a pivot-stud body having a hole therethrough through which said screw shank passes, said pivot-stud body having first and second pivot studs extending laterally therefrom in opposite directions;
  c. first and second pairs of scissor-like jaw levers pivotally mounted on said pivot studs on opposite sides of said screw shank, said levers adapted to form forward and rearward jaw openings on each side of said screw shank;
  d. a nut body threaded on said shank forward of said pivot-stud body, said nut body having first and second camming studs extending laterally therefrom in opposite directions into the forward jaw openings of said first and second pairs of jaw levers on opposite sides of said screw shank; and
  e. a shoulder-stud body having a hole therethrough through which said screw shank passes, said shoulder-stud body being rearward of said pivot-stud body but forward of said thrust bearing surface, said shoulder-stud body having first and second camming studs extending laterally in opposite directions therefrom into the rearward jaw openings of said first and second pairs of jaw levers on opposite sides of said screw shank.

2. A spreading tool according to claim 1 wherein said thrust bearing surface is formed by the handle portion of said screw and adapted to bear against said shoulder-stud body.

3. A spreading tool according to claim 1 wherein said screw shank has a rearward portion which is non-threaded, said non-threaded rearward portion being forward of said thrust bearing surface.

4. A spreading tool according to claim 3 wherein said shoulder-stud body is supported on the non-threaded portion of said shank.

5. A spreading tool according to claim 3 wherein said pivot-stud body is supported on the non-threaded portion of said shank.

6. A spreading tool according to claim 4 wherein said pivot-stud body is supported on the non-threaded portion of said shank forward of the shoulder-stud body.

7. A spreading tool according to claim 2 wherein said screw shank has a rearward portion which is non-threaded, said non-threaded rearward portion being forward of said thrust bearing surface.

8. A spreading tool according to claim 7 wherein said shoulder-stud body is supported on the non-threaded portion of said shank.

9. A spreading tool according to claim 7 wherein said pivot-stud body is supported on the non-threaded portion of said shank.

10. A spreading tool according to claim 8 wherein said pivot-stud body is supported on the non-threaded portion of said shank forward of the shoulder-stud body.

11. A hand tool for spreading, or maintaining at spaced separation, caliper-mounted disc-brake pads for facilitating mounting on a disc-brake rotor, said tool comprising:
  a. an elongated screw having a threaded shank at one end and a thrust bearing surface at the other end;
  b. a pivot-stud body mounted for sliding movement on said screw shank, said pivot-stud body having first and second pivot studs extending laterally therefrom in opposite directions;
  c. first and second pairs of scissor-like jaw levers pivotally mounted on said pivot studs on opposite sides of said screw shank, said levers adapted to form forward and rearward jaw openings on each side of said screw shank;

d. a nut body threaded on said shank, said nut body having first and second camming studs extending laterally therefrom in opposite directions into the jaw openings of said first and second pairs of jaw levers on opposite sides of said screw shank; and e. a shoulder-stud body mounted for sliding movement on said screw shank, said shoulder-stud body being located between said pivot-stud body and said thrust bearing surface, said shoulder stud body having first and second camming studs extending laterally in opposite directions therefrom into the other jaw openings of said first and second pairs of jaw levers on opposite sides of said screw shank.

12. A hand tool according to claim 11 wherein:

a. said tool has a handle at the rearward end of said shank;

b. said thrust bearing surface is formed by said handle;

c. said threaded shank is at the forward end.

* * * * *